United States Patent
Chen et al.

(10) Patent No.: US 8,244,204 B1
(45) Date of Patent: Aug. 14, 2012

(54) TIMED OVERRIDE OF INCOMING CALL RESTRICTIONS TO FACILITATE CALLBACK AFTER AN EMERGENCY CALL

(75) Inventors: Ben-Ren Chen, Northborough, MA (US); Robert Martin Ephraim, Bridgewater, NJ (US); Rohit Satish Kalbag, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 778 days.

(21) Appl. No.: 12/000,229

(22) Filed: Dec. 11, 2007

(51) Int. Cl.
*H04M 11/00* (2006.01)
(52) U.S. Cl. .............. 455/404.1; 455/456.1; 379/114.28
(58) Field of Classification Search ................ 455/404.1
See application file for complete search history.

(56) References Cited

U.S. PATENT DOCUMENTS

| | | | |
|---|---|---|---|
| 6,249,674 B1 * | 6/2001 | Verdonk .................... | 455/404.1 |
| 6,373,930 B1 * | 4/2002 | McConnell et al. ..... | 379/114.28 |
| 7,133,683 B1 | 11/2006 | Budney et al. | |
| 7,190,947 B2 * | 3/2007 | Binzel et al. ............... | 455/404.1 |
| 2004/0176066 A1 * | 9/2004 | Binzel et al. ............... | 455/404.1 |
| 2005/0243974 A1 * | 11/2005 | Pearson ...................... | 379/37 |
| 2007/0041516 A1 * | 2/2007 | Dickinson ................... | 379/45 |

FOREIGN PATENT DOCUMENTS

WO WO 2004072784 A2 * 8/2004

OTHER PUBLICATIONS

Cellular Networking Perspective, vol. 9 No. 7 Jul. 2000.*

* cited by examiner

*Primary Examiner* — Charles Shedrick

(57) ABSTRACT

A mechanism is provided to suspend or modify incoming call restrictions for a subscriber station for some time period when it is detected that an emergency call was made by that subscriber station, so as to disable the restriction that would otherwise block completion of an incoming call to that station. This allows a call placed by emergency personnel in response to the emergency call from the subscriber station (i.e. when the emergency personnel calls back the user that is involved in the emergency) to bypass any restrictions setup by the subscriber or by the network that would otherwise block the callback and allows the emergency callback to potentially reach the caller. This approach results in a systematic solution to blocking of emergency callbacks that applies to various kinds of restriction services yet is relatively simple to administer.

25 Claims, 5 Drawing Sheets

TIMED OVERRIDE OF INCOMING CALL RESTRICTIONS TO FACILITATE CALLBACK AFTER AN EMERGENCY CALL

TECHNICAL FIELD

The present subject matter relates to techniques and equipment to override, suspend, modify or turn off call processing features or restrictions that might block an incoming call, in response to an emergency call, so as to allow a callback for a time following the emergency call.

BACKGROUND

In recent years, telecommunications service providers have developed a variety of special service features that may prevent an incoming call to a customer's telephone or mobile station. Such features, for example, include various call blocking services and parental control. With such services, the network will block an incoming call at least under certain circumstances, e.g. at certain times of day, unless the identification of the calling party or station meets certain criteria (is recognized as that of an acceptable caller) or the caller enters an acceptable password or personal identification number (PIN). Prepaid services also may prevent an incoming call when the balance on the prepaid account is insufficient to pay for any costs that may be associated with the called party answering the call.

Modern telecommunications networks also support emergency calling with a variety of related features to help insure that public safety personnel receive each emergency call and have all data that may help them to respond quickly in an appropriate manner. In the US, emergency calls are typically made by dialing 911 on the landline telephone or mobile station. The network routes such a call to a public safety answering point (PSAP) and provides ancillary data, such as caller location information. These types of services have proven very effective.

Hence, when a subscriber places a call to well known emergency numbers such as 911, the network currently recognizes this as an emergency call and takes special action to route the call to the appropriate PSAP where emergency call takers can assist the subscriber. The network also facilitates the PSAP personnel to retrieve the physical location of the subscriber and also the phone number of the subscriber (i.e. callback number). In the US, the FCC (Federal Communication Commission) has various mandates which cover what information needs to be provided to PSAPs for various telecommunication services. In cases wherein the call gets disconnected abruptly, the PSAP personnel try to reach the subscriber again by calling the callback number that is provided by the network. It is imperative that the callback option is available.

When the PSAP calls back the station that initiated the emergency call, there is currently nothing special in the call related signaling or otherwise to indicate to the network that this call is originating from an emergency service responder or that this call is related to an emergency. As there is nothing special about the emergency callback it gets treated as a regular incoming call by the network. If the subscriber has a restriction of some type associated with the callback number that blocks incoming calls, the network may not deliver the call from the PSAP personnel to the caller involved in the emergency, based on the applicable subscriber or network restriction. Failure to deliver the callback may hamper efforts of emergency personnel to determine the nature of the emergency and/or provide the appropriate response.

It may help to consider a few more examples of the services that may block the emergency callback, in somewhat more detail, before discussing prior efforts to address this conflict. There are various services that a subscriber may activate or restrictions that the network enforces that can prevent the emergency callback from reaching the subscriber. One example is a Selective Call Acceptance service. This service allows a subscriber to create a list of numbers associated with permitted calling parties' stations or lines. Only those callers having their numbers on that list will be able to ring onto the subscriber's line or mobile station. When someone whose number is not on the subscriber's list tries to call (e.g. the PSAP personnel trying to reach the subscriber after interruption of an emergency call), they will be notified that the subscriber is not accepting calls from them at this time.

Another service example is a call intercept service. This service enables a subscriber to apply a "Do Not Disturb" capability so that incoming calls are not permitted to reach the subscriber's number (incoming calls to the subscriber telephone line or mobile station) unless the call is from a previously authorized list of numbers, or if the calling party has a special Personal Identification Number (PIN). When the service is active, it may not be possible for the PSAP call taker to complete a callback to the calling party because of the incoming call restriction.

Other flavors of the above service exist (e.g. incoming call screening, etc.) in wireline, wireless and VoIP networks that would inadvertently result in restricting the callback from the PSAP. Callback from the PSAP could also be restricted as a side-effect from services like prepaid, usage control, parental monitoring etc. For example, if the subscriber associated with the telephone or mobile station that made the 911 call had only X minutes of usage for placing incoming and outgoing voice calls and if those X minutes get consumed prior to or during the emergency call, the network may permit the outbound 911 call but block the in-bound callback from the PSAP personnel.

There have been prior suggestions to address these issues regarding conflicts between various types of call blocking and the need to permit callbacks from the PSAP. For example, all the lines in the PSAPs that could be used to make a callback after a 911 call could be identified. These numbers can be placed into a database associated with the service that will recognize a call from one of the numbers as a PSAP callback and disable the incoming call restriction allowing the call to complete to the telephone or mobile station that made the 911 call. Alternatively, for services that can be bypassed by a subscriber entered PIN an administrative PIN can be designated as an override PIN to be used by the PSAPs to disable the incoming call restriction.

These prior approaches have not proved entirely satisfactory. Entry of the PSAP numbers for use as known numbers from which incoming calls are permitted involves developing and maintaining a potentially large database, because each PSAP may have a large amount of different numbers associated with it that may appear in the signaling for outbound calls such as those associated with 911 callback attempts. There are more than 6000 PSAPs in the nation, therefore maintaining an accurate database of outgoing PSAP lines is not really practical. The PIN solution is applicable only to services that can be overridden by a PIN, which is not necessarily true of all services or other restrictions that might otherwise block a callback from a PSAP. The PIN solution, for example, may not be enough to allow a callback if the restriction relates to a balance on a prepaid account of the party involved in the emergency. Also, the PIN approach requires knowledge and use of the PIN in response to network prompts. If required to be done manually, this introduces opportunities for human error. Even if automated, the PIN entry introduces additional delay in the callback operation. Also, service specific override PINs could become known to unauthorized persons and could be misused.

Hence, a need exits for a more effective technique to prevent incoming call restrictions from blocking a callback after an emergency call.

SUMMARY

Various technologies are disclosed herein to solve the problem of blocking emergency callback calls because of subscriber or network restrictions on incoming calls in a manner that improves over one or more of the above-discussed prior efforts to address the problem. The disclosed approach starts a time period in response to the emergency call during which inbound calls will be permitted regardless of a call processing restriction that might otherwise block incoming calls, to provide an opportunity for a callback by emergency personnel if necessary. This approach results in a systematic solution that applies to various kinds of restriction services, e.g. without relying on a special database consisting of PSAP outgoing numbers or service specific overrides (e.g. administrative PINs).

For example, one disclosed method of call processing in a communication network involves detecting an outgoing emergency call from a subscriber station configured for communication via the network and completing the emergency call from the subscriber station through the network to an answering point. Based on the detection of the outgoing emergency call, however, a restriction on incoming calls is automatically suspended or modified for a period of time period. The suspension or modification disables the restriction that would otherwise block completion of an incoming call to the subscriber station following the emergency call, for the particular time period.

The time period may start immediately upon detection of the emergency call, at any of several points during the emergency call, or in response to an end of the emergency call. During the time period, if there is an incoming call, e.g. from the answering point, the network will complete the incoming call without applying the restriction.

The methodology is applicable in a variety of different types of landline and mobile networks. For example, the technique may be implemented as part of a circuit switched operation, in a landline telephone network or a cellular telephone network. An example is also described for implementing the timed suspension of the inbound calling restriction(s) in a packet network using voice over Internet Protocol (VoIP) and a "softswitch." The technique may also be applicable in an enhanced all-packet transport architecture based on an IP Multimedia Subsystem (IMS) model.

When implemented in a wireless mobile communication network using intelligent network triggering and separate call processing logic, an additional problem arises because the mobile switching center typically has been configured to bypass or escape intelligent network triggers upon detecting an emergency call, e.g. in response to the user dialing 911. Two specific techniques are proposed below for providing notice to the call processing logic in such networks, so as to allow the call processing logic to disable the incoming call restriction(s) for a period of time when the user has made an emergency call from a mobile station.

One such approach provides a method of call processing in a wireless mobile communication network, involving detecting an attempt to make (or on completion of) an outgoing emergency call from a mobile station configured for communication via the wireless mobile communication network, at a mobile positioning center. A service control point is notified from the mobile positioning center of the attempt to make the outgoing emergency call from the mobile station. The emergency call is completed from the mobile station through the wireless mobile communication network to an answering point. This methodology also entails automatically suspending or modifying a restriction on incoming calls through the wireless mobile communication network to the mobile station, for a time period. This effectively prevents the restriction from otherwise blocking completion of an incoming call to the mobile station following the emergency call, for the time period. With this first approach, it is not necessary to modify the trigger processing of the switching elements of the network, e.g. they can still be configured to bypass or escape triggering and associated signaling activities and immediately complete the emergency call to the answering point.

The alternative approach to providing processing in a wireless mobile communication network involves detecting an attempt to make (or on completion of) an outgoing emergency call from a mobile station configured for communication via the wireless mobile communication network, at a mobile switching center of the network. This may involve a modification of the trigger processing, in this case, at the mobile switching center. Here, the detection triggers communication of a message to a service control point from the mobile switching center, which notifies the service control point of the attempt to make the outgoing emergency call from the mobile station. The emergency call is completed from the mobile station through the wireless mobile communication network to an answering point. However, the service control point automatically suspends or modifies a restriction on incoming calls through the wireless mobile communication network to the mobile station, for a time period. This action at the service control point prevents the restriction from otherwise blocking completion of an incoming call to the mobile station following the emergency call, for the time period.

Although the discussions above have focused on various techniques intended to facilitate callback from an answering point after an emergency call, those skilled in the art will appreciate that concepts discussed herein are also embodied in networks and/or elements that make up a network, which may be involved in processing emergency calls and subsequent callbacks.

For example, the disclosure below presents several examples of communication networks that offer communication service and handle emergency related call. Such a network may be thought of as comprising a switch fabric for establishing communications to and from stations configured for communication through the network, and processing logic for controlling the switch fabric in response to attempts to establish communications for the stations, to implement communication services offered by an operator of the network to subscribers associated with the stations. The processing logic is configured to implement a restriction on incoming calls to one of the stations. In the examples discussed in more detail below, the processing logic also is configured to suspend or modify the restriction on incoming calls for a time period, in such a manner as to prevent the restriction from otherwise blocking completion of an incoming call to the one station, in response to an emergency call from the one station through the network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein relate to techniques and network equipment configured to temporarily override incoming call restrictions to facilitate callback after an emergency call. Essentially, in response to an emergency call, the network starts a time period and suspends or modifies any restrictions that might otherwise block incoming calls during that period. The time period effectively provides a window during which emergency personnel have the ability to callback, if necessary.

Figure 1:
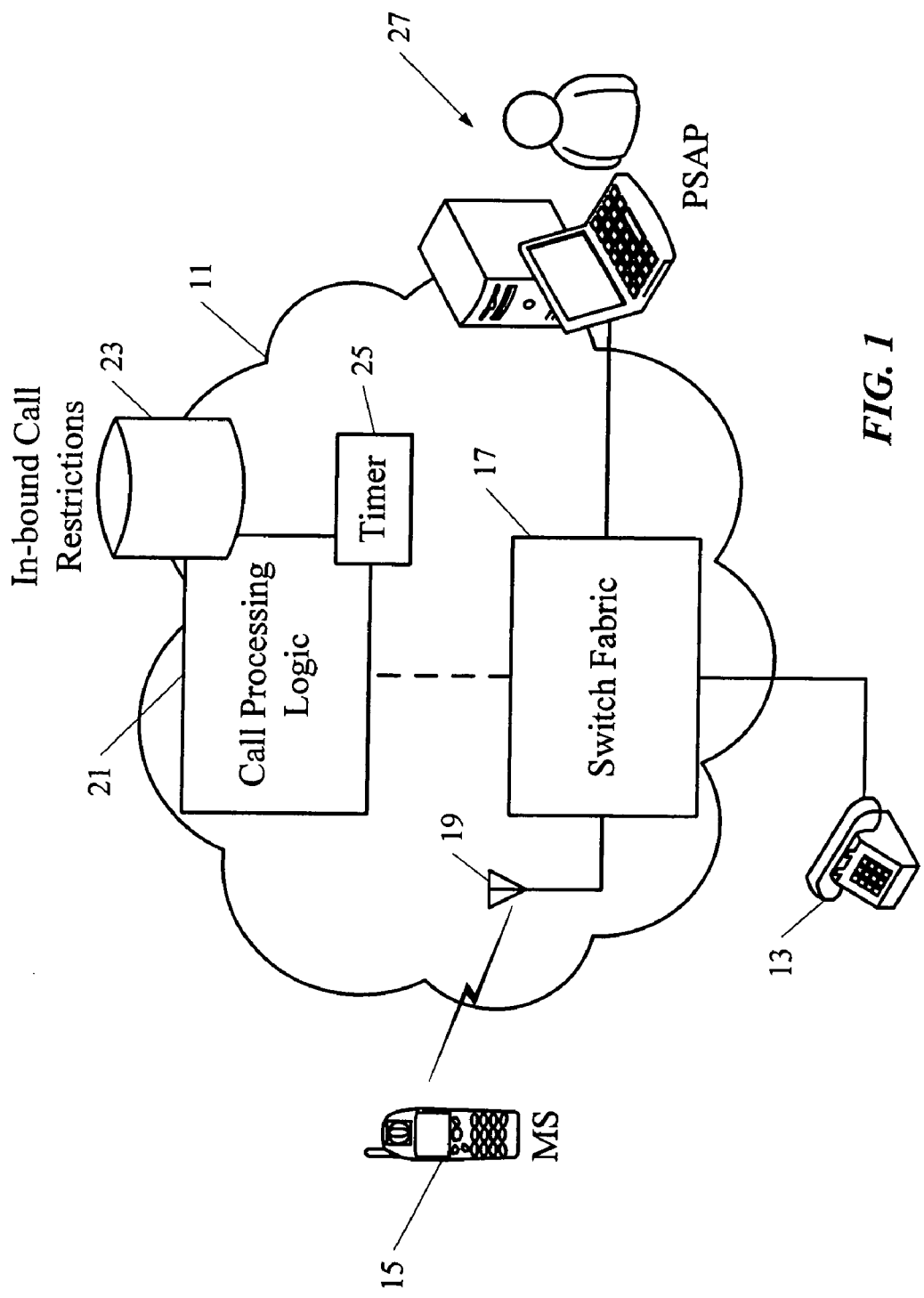
FIG. 1 is a high-level functional block diagram of a network offering various telecommunications services and features, including 911 emergency calling, and implementing a timed override of incoming call restrictions to facilitate callback after an emergency call.

Reference now is made in detail to the examples illustrated in the accompanying drawings and discussed below. FIG. 1 illustrates a network 11 that provides communication services for various subscriber stations. Two stations 13 and 15 are shown in the drawing. Subscriber station 13 may represent one or more telephones (e.g. extensions) at a subscriber's premises, which communicate via a landline coupled to the network 11. The stations 11 are wireless mobile stations configured for voice and/or data communication, such as mobile stations which communicate via public cellular communication networks.

The network 11 includes a switch fabric 17 for routing communications of various types, here referred to as "calls," to and from the stations 13 and 15. For a telephone type station 13, the switch fabric 17 connects via an appropriate landline network link with the subscriber station or stations at the particular location. In-premises communications may use any available landline or wireless technology. For the mobile stations 15, the network 11 includes one or more antennas 19 coupled to the switch fabric 17, for RF communications over the air. RF transceiver equipment in or associated with the switch fabric is omitted for convenience. Examples of wireless communications networks and implementation of the call processing strategies in such networks are discussed in more detail, later.

The switch fabric 17 may use any appropriate technology to complete calls between stations 13 and 15 and/or between the subscriber stations 13 and 15 and other communications equipment. To control call processing by the switch fabric 17, the network also includes call processing logic 21. The logic 21 may be implemented in switching or routing elements of the switch fabric 17 or as separate processing elements in signaling communication with the network switch fabric 17. The separate illustration in FIG. 1 is given by way of example, as it may help the reader to understand the call processing concepts under discussion here.

Essentially, the switch fabric 17 receives signaling representing requests from the subscriber stations 13 and 15 to complete calls; and at one or more points in the call processing, the switch fabric 17 looks to the call processing logic 21 for instructions as to how to handle the requested calls. Modern call processing logic can be programmed to offer a wide range of services/features for various parties subscribing to communications services through the network 11. Of note for purposes of this discussion, some services or features provide restrictions on incoming calls otherwise intended for the subscriber stations 13 and 15. Typically, the call processing logic 21 will include or have access to programming and/or data shown generally at 23, which defines restrictions on incoming calls to at least some of the subscriber stations 13 and 15. For example, if a party using the landline telephone type station 13 initiates a call to the mobile station 15, the switch fabric 17 detects the request for the call and informs the call processing logic 21. The logic 21 may check data 23 to determine if there are any applicable restrictions, and if so, the logic 21 will instruct the fabric 17 to block completion of the call to the mobile station 17, e.g. by routing the call to an alternate destination or by providing the caller a message indicating the call can not be completed.

The call processing logic 21 may implement a wide range of other functions in relation to control processing of calls (to and from subscriber station 13 and 15 through the network 11. As will be discussed later, the exemplary logic 21 also provides a timer function 25 for use in providing a time window for a callback following an emergency call.

For emergency calls, the network 11 includes or communicates with an appropriate answering point. In an example for 911 type service in the US, the answering point would be a public safety answering point (PSAP), one of which is shown at 27 in the drawing. With the exemplary implementation, a user dials 911 on the landline telephone station 13 or the mobile station 15, to request the emergency call. In general, the network 11 routes such a call to the appropriate PSAP 27 and provides ancillary data, such as caller location and/or callback information.

For purposes of this discussion, we will assume that there is a restriction applicable to incoming calls to the calling party. The switch fabric 19 detects the 911 call request, informs the call processing logic 21, and completes the call to the PSAP 27. However, the detection of the 911 call request also causes the call processing logic 21 to start the timer 25, with respect to the mobile station 15 or the telephone line of the station 13 that initiated the 911 call. The call processing logic 21 automatically suspends or modifies the applicable restriction so as to disable any blocking of subsequent incoming calls, if any, for the period set by the timer 25. In this way, the call processing logic 21 automatically enables completion of incoming calls for the set time period, so as to allow completion of any incoming call to the subscriber station following the 911 call. Although other parties may call in during this time, the time period provides a window of opportunity for PSAP personnel to call back to the person who made the initial 911 call.

Techniques are disclosed for starting the period of suspension or modification for incoming call service restrictions, which support starting the period at any time between the beginning and the end of the 911 call. However, the duration of a 911 call is unpredictable. Hence, it may be desirable to start the period of suspension or modification for incoming call service restrictions at the end of the 911 call. Otherwise, that suspension or modification period might sometimes end too soon following the end of a 911 call to be useful; in fact that suspension or modification period might sometimes end before the 911 call ends.

Figure 2:
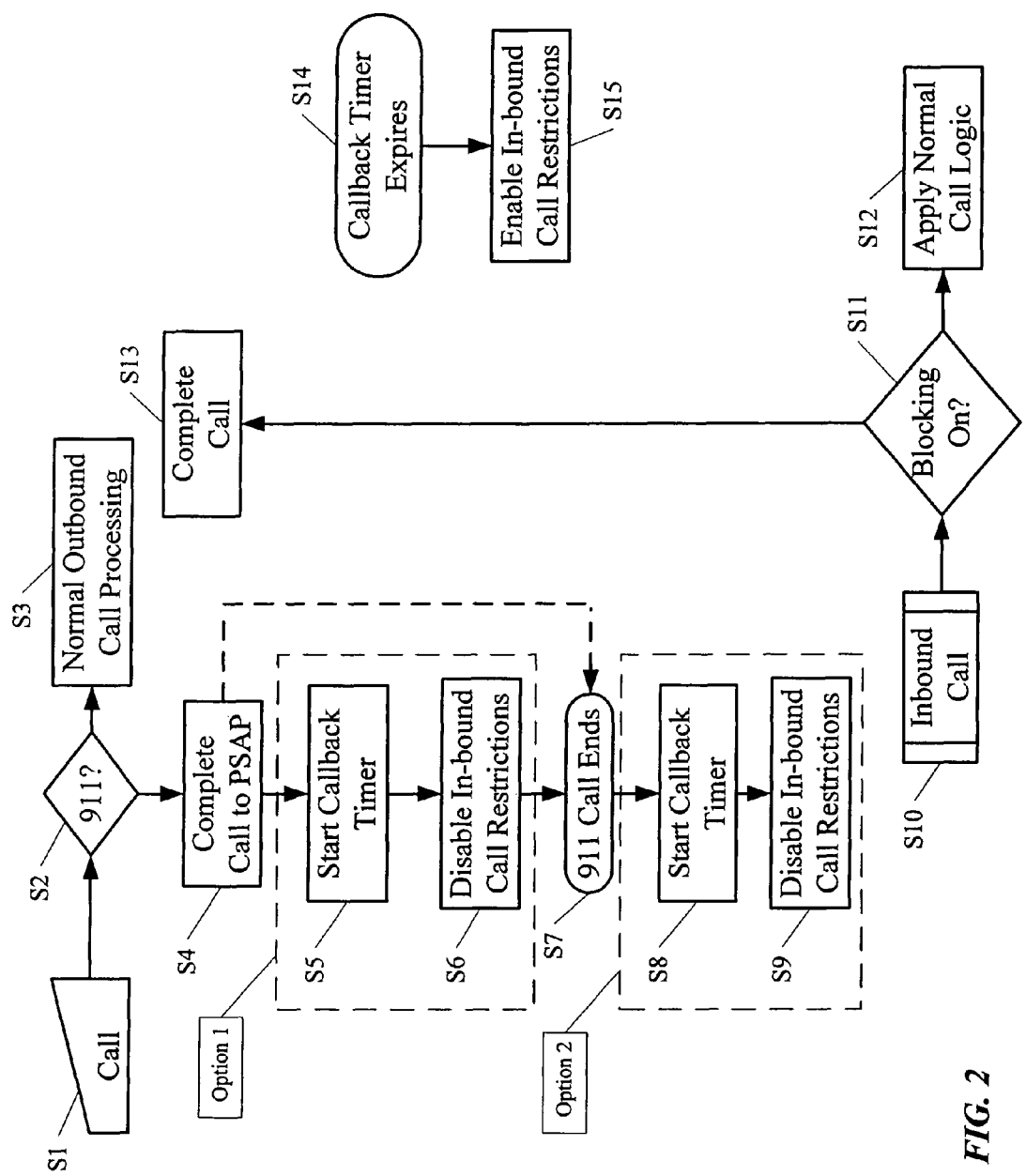
FIG. 2 a flow chart useful in exampling the sequence of call processing events and associated logic involved in a 911 emergency call, with the timed override of incoming call restrictions to facilitate callback after an emergency call.

It may be helpful to consider call processing with regard to the flow chart of FIG. 2. To simplify this discussion, we will assume that the 911 call originates from the landline telephone station 13, although obviously similar processing would occur for 911 calls from mobile stations 15. Hence, in step S1, the user of station 13 dials the number for a new outbound call; and this call request is detected by the switch fabric 17, which informs the call processing logic 21. At step S2, the call processing logic determines if the call is an emergency call, e.g. a 911 call. If not, then the network processes the outbound call in its normal manner (step S3). However, if the call processing logic 21 determines at S2 that the call is a 911 call, then processing branches to step S4. In that step, the call processing logic 21 directs the switch fabric 17 to complete the call to the PSAP 27.

The determination that the call is a 911 or other emergency call also enables the call processing logic 21 to disable any restrictions that might block an incoming call to the telephone station 13 (or mobile station 15) for a period of time. The disabling of the restrictions provides a time window during which the PSAP personnel may call back if necessary. The timing of this period may be implemented in a number of different ways, and the flow chart of FIG. 2 shows just two examples thereof, as alternative ways to further process the call.

In a first example (option 1 in FIG. 2), the call processing logic starts a timer 25 (at S5) and disables any otherwise applicable in-bound call restrictions (at S6) essentially in response to its detection of the 911 call. The precise chronological order of steps S4-S6 is not material, and the illustrated sequence is given only by way of example. It is intended that the time window offered by the timer 25 should extend beyond a possible end or interruption of the 911 call, represented by step S7 in the drawing. However, to do so from the time of 911 call detection may require a relatively long time period, based on an estimate of times typically needed for PSAP personnel to properly handle a 911 call and make any callback that may be needed. Steps S8 and S9 would be omitted if option 1 is used.

The alternative approach illustrated in the flow chart involves starting the time period after the end of the 911 call itself. Hence, with the alternative example (option 2 in the drawing), the timer 25 is not necessarily started responsive to detection of the 911 call. The in-bound call restrictions could be disabled, although in our example, they are not. Steps S5 and S6 would be omitted, and call processing would flow from S4 to S7 as represented by the dotted line arrow. Assume now that the 911 call ends at step S7. Upon detection of the end of the 911 call, the call processing logic starts a timer 25 (at S8) and disables any otherwise applicable in-bound call restrictions (at S9). The precise chronological order of steps S8 and S9 is not material, and the illustrated sequence is given only by way of example.

In either case, option 1 or option 2, some period of time should exist after the 911 call ends during which restrictions on in-bound calls are modified or suspended so as to disable blocking of incoming call to the source of the 911 emergency call.

Assume now that there is a new call initiated to the calling station or location. At step S10 the in-bound call request is detected by the switch fabric 17, which informs the call processing logic 21. If the new in-bound call occurs while the in-bound restrictions apply, the call should be blocked from routing to the called destination, and processing flows through step S11 to S12, where the network applies the normal call logic. However, if the new in-bound call occurs during the time period with the in-bound call restrictions are disabled, processing flows through step S11 to S13. At S13, the call processing logic 21 causes the switch fabric 17 to complete the in-bound call to the station or location from which the 911 call was recently made. In this way, the PSAP personnel can call back to the 911, during the period set by the timer.

The in-bound call restrictions should normally apply. Hence, the call processing logic 21 will determine when the period of the callback timer 25 expires (step S14). In response to the expiration, the call processing logic 21 will enable the applicable in-bound call restrictions (step S15). In the example, the time period for call back was set by a simple timer 25. Other approaches for providing the timed callback period may apply. For example, where the restriction(s) relate to a prepaid service of the 911 caller, the prepaid restrictions may be provided by adding some number of free prepaid credit to the caller's account. The free prepaid credits would be deducted or expired at some later time to re-enable the otherwise appropriate balance on the prepaid account.

As outlined above, the use of a timer or other means to define a time period for callback after an emergency call prevents in-bound call restrictions from inadvertently blocking a callback from a PSAP. This approach may be applied in a variety of different ways in various modern telecommunications networks.

For example, the technique may be implemented as part of a circuit switched operation. For services that are completely realized by a CLASS 5 switch, the call processing and service processing logic resides in the same network entity and therefore can be implemented within the switch without requiring communication to any elements external to the switch. The general approach described above relative to FIGS. 1 and 2 applies.

Recently, competitive telephone services have been offered via a packet network, using voice over Internet Protocol (VoIP). Typically, VoIP services utilize packet switching for the switch fabric, and the call processing is implemented by a so-called "softswitch." In a VoIP-Softswitch implementation, the bearer, signaling, call processing and service logic are separated. A softswitch generally uses an application server to provide various value-added services to the subscribers. Most current implementations rely on the Session Initiation Protocol (SIP) for the signaling to set-up calls for voice and other multimedia session. In this case, the SIP signaling would be routed to the application server for emergency calls, instead of bypassing the application server for the emergency call. The application server would recognize that an emergency call is being made and take the steps to modify or suspend restrictions to disable any incoming call blocking for the subscriber station for the time period, as outlined above relative to FIGS. 1 and 2.

Carriers in both landline and wireless domains are migrating to an enhanced all-packet transport architecture based on an IP Multimedia Subsystem (IMS) model. The IMS mode of operation decomposes a voice switch into many functional elements which interact with each other using standardized interfaces. Transport for bearer traffic and signaling uses IP packets. The IMS model also allows multiple application servers to work together to provide a wide array of services to the consumer. A possible mechanism to implement the timed disablement of the in-bound call restrictions, in the IMS environment, is as follows:

1. All the Application Servers offering restriction service will need to subscribe to subscriber profile updates.
2. The Emergency Call Service Control Function (E-CSCF) that handles emergency calls will on completion of an emergency call notify the Home Subscriber Server (HSS) using the Sh interface (for application servers) or the Cx interface (for CSCFs).
3. On receiving the notification from the E-CSCF, the HSS will disable various restriction features in the profile and notify all the IMS Application Servers of the profile change and start a timer.
4. On receiving this profile change notification the Application Servers will honor the disabling of the various restriction features.
5. When the timer in the HSS expires the HSS will enable the restriction services in the subscriber's profile and notify all the Application Servers.
6. On receiving this profile change notification the Application Servers will honor the enabling of the various restriction features.

Modern public switched telephone networks as well as many public wireless mobile communication networks rely on intelligent or advanced intelligent network type call processing. In an intelligent network based service, the call processing in the network switch fabric is separated from service or call processing logic, and communication between the two takes place using a signaling network typically separate from the bearer traffic network, for example via a signaling system 7 (SS7) network. Call processing is carried out by the switch (service switching point or "SSP") and service processing is done by a service control point (SCP). The switch has various call processing detection points which when armed, trigger messages to the SCP; and the SCP in turn provides further instructions that are processed by the switch point. The general implementation of the processing of FIGS. 1 and 2, for this network model would be to trigger a query message to the SCP when the switch detects that an emergency call has been placed. On receipt of the query, the SCP would suspend any restriction services and resume them after the time period expires. This approach could be applied in intelligent network implementations of a landline network, e.g. in a modern public switched telephone network. A similar approach could be used in a wireless intelligent network.

In the example of FIG. 2, the call processing logic was informed of the emergency call upon detection, e.g. when the switch fabric detected the dialing of the 911 digits for the call. However, the call processing logic can be informed at the start of the call, mid call or at the end of the call that an emergency call has been placed to suspend incoming call restrictions. Although set by the call processing logic in our example, the service suspension timer can be run in the service oriented logic, processing logic of the switch fabric or any other place that interacts with the network.

The discussion above provides a relatively high level overview and a general outline of how the timed over-ride or disablement of in-bound call blocking may be used to permit a callback following an emergency call. More specific examples are discussed below, with regard to an intelligent network type implementation of a public wireless network offering mobile communication services, such as a modern cellular telephone network. Before discussing two call processing examples, it may be helpful first to discuss an example of such a mobile wireless communication network 100, with reference to FIG. 3.

The communication network 100 provides mobile voice telephone communications, and today would typically also offer a variety of packet data services, for numerous mobile stations. For purposes of later discussion, two mobile stations 15 appear in the drawing (15$_1$ and 15$_2$); each operated by a different user. The stations 15 represent the general class of mobile stations that operate via a public cellular network or the like.

The network 100 enables users of the mobile stations 15 to initiate and receive telephone calls to each other as well as through the public switched telephone network (PSTN) 111, for example for communications with landline telephone devices such as telephone station 13. For purposes of further discussion of emergency calls and related callback, the network 100 also supports calls to and from the PSAP 27. The network may also enable users of the mobile stations 15 to initiate and receive various data communications, for example through a WAN, to the public data network referred to as the Internet (not shown).

The mobile stations 15 may take many forms. For example, some mobile stations may take the form of portable handsets, although they may be implemented in other form factors. Other mobile stations may comprise portable digital assistants (PDAs) with built-in wireless communication capabilities and possibly a voice interface. As another alternative, a wireless device such as network interface card or even a mobile telephone having data communication capabilities may be connected to or integrated into a portable computing device, such as a handheld or laptop type computer.

In the example, the mobile wireless communication network 100 is a cellular type network. Physical elements of a radio access network (RAN) portion thereof include a number of base stations. Two sets of base stations 113 and 115 appear in the drawing, for purposes of providing an example for discussion here. Each base station 113 or 115 typically includes a base transceiver system (BTS) not separately shown, which communicates via antennae and the air-link with the mobile stations 15, when within range. The base station radio tower is located within a coverage area often referred to as a "cell."

A typical current example of the network also includes a number of radio access network switches. The drawing shows two such switches 117 and 119, by way of example. In a circuit switched implementation, the switches 117, 119 typically are modern versions of mobile switching centers (MSCs) or Mobile Telephone Switching Offices (MTSOs), which support both cellular voice and packet data services. Each MSC switch 117 or 119 connects through trunk circuits to a number of the BTS transceivers of the base stations 11 or 115, which the respective switch serves and controls. Of course, those skilled in the art will recognize that packet switching or other technologies could be used.

The BTS at a base station assigns and reassigns channels to the mobile stations 15 that it serves and monitors the signal levels to recommend hand-offs to other base stations. The network typically includes a base station controller (BSC) functionality that controls the functions of a number of base stations and helps to manage how calls made by each mobile station are transferred (or handed-off) from one serving base station to another. Each wireless network equipment vender implements this function differently. Some vendors have a physical entity, which they call a BSC, while other vendors include this functionality as part of their MSC switch.

The illustrated network uses an intelligent network approach to call processing. In the example, each MSC type switch 117 or 119 is configured to detect trigger events in call processing and communicate with an appropriate control point to obtain further directions or additional information needed to process individual calls. Hence, each MSC is configured as a service switching point (SSP) for wireless intelligent network (WIN) call processing purposes.

Actual customer communication traffic is carried between MSC switches and/or to and from the PSTN 111 via links referred to as "bearer" channels, typically over interoffice trunk circuits. Modern networks of the type generally illustrated in FIG. 3 also include an out-of-band signaling network for carrying a variety of different signaling communications relating to the customer traffic and network health. In the example, the signaling network is implemented as a signaling system 7 (SS7) type network. A SS7 network 121 comprises a number of signaling transfer points (STPs) 123, typically implemented as redundant mated pairs, and links to other nodes or elements that communicate via the SS7 network 121. In the drawing, signaling links via the SS7 network are represented by dotted lines. In the example, the MSCs 117 and 119 have links to the STPs 123 of the SS7 network 121. The SS7 network 121 also links to signaling elements of the PSTN 111. The PSAP 27 may also have a link to an STP 125 of the SS7 network 121.

The carrier operating the wireless network 100 also operates a home location register (HLR) that stores subscriber profiles and related call processing control information for each of that carrier s wireless subscribers and their associated mobile stations 15. The HLR may reside in the home MSC, however, in the example, the HLR resides in a centralized node sometimes referred to as a service control point (SCP) 125. The SCP 125 communicates with the MSCs 117 and 119 via data links and one or more of the signaling transfer points (STPs) 123 of the SS7 network 121. As recognized in the art, the HLR stores for each mobile subscriber the subscriber's mobile telephone number, the mobile identification number, information as to the current point of attachment of the mobile station to the network (e.g. identification of the serving MSC) and information specifying the wireless services subscribed to by the mobile subscriber, such as numeric call block services, multiple alerting, etc.

For many of the features applied to calls through the network, the same or a different SCP 125 also provides the call processing logic. When a trigger causes a AIN SSP type MSC to launch a query regarding a customer service or feature, the SCP 125 accesses the appropriate call processing record (CPR) in its subscriber database and responds with an instruction to the SCP as to how to further process the call.

Figure 3:
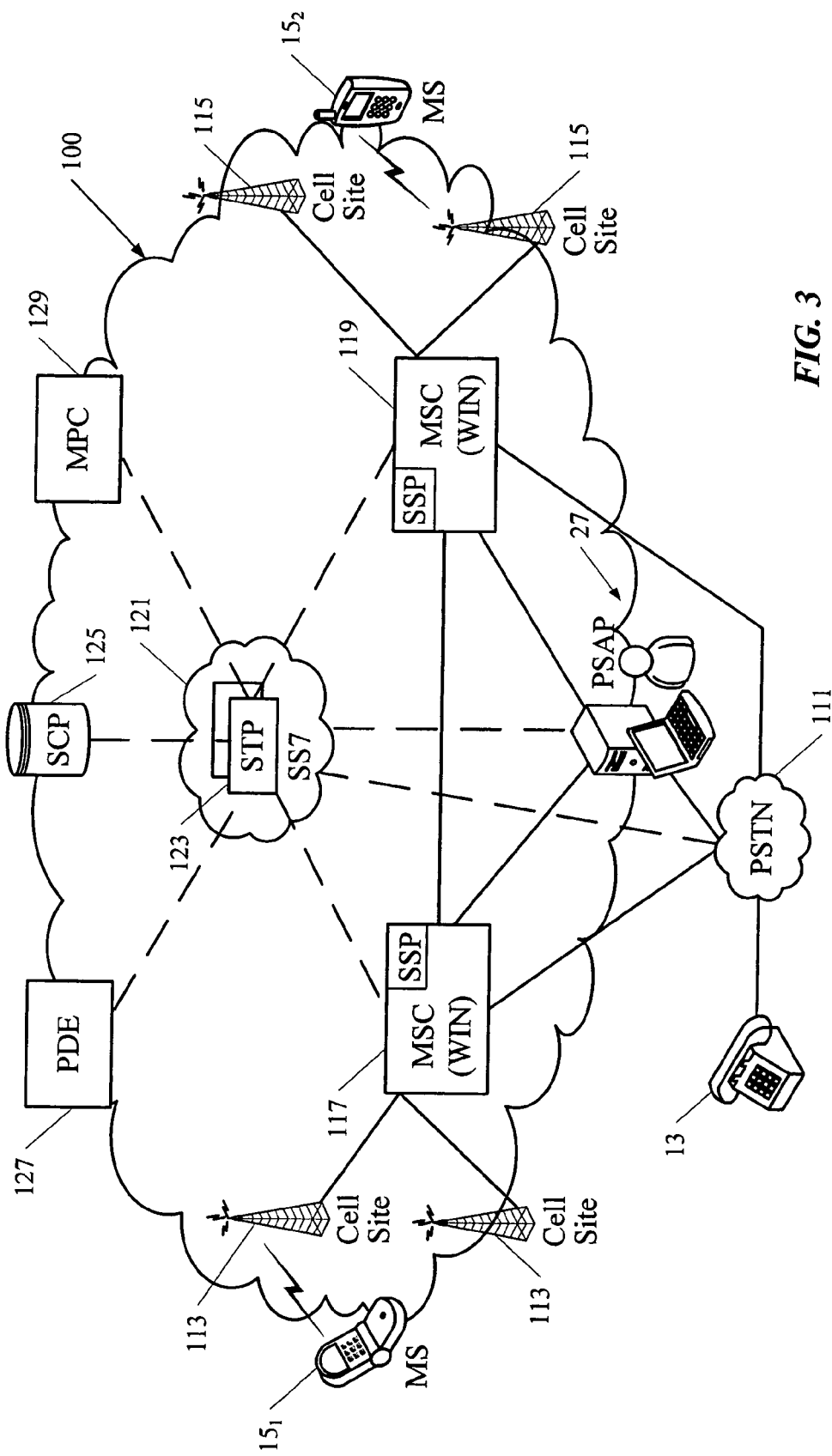
FIG. 3 is a high-level functional block diagram of a mobile wireless communication network, for discussion of more specific examples using intelligent network call processing.

Hence, in the example of FIG. 3, the WIN type MSC switches 117 and 119 provide the switching fabric, although they may implement at least some call processing logic. The MSCs for example may implement some lower layer call processing logic. However, higher layer call processing logic, for advanced services or features, is typically implemented at the SCP 125. For example, logic for service features that restrict incoming calls to mobile stations 15 is implemented by CPRs and associated programming in the SCP 125. Suspending or modifying such restrictions involves notifying the SCP 125 of 911 or other emergency calls.

As will be discussed more later, one exemplary technique to suspend or modify call processing restrictions that might block an incoming call in response to an emergency call through the network 100 relies on an element of the network involved in the position determination for the station from which the emergency call originated, to provide the notice to the call processing logic implemented by the SCP 125. Hence, the network diagram also shows elements supporting the position determination.

For location based services, including mobile station location during an emergency call, the network 100 also includes a position determining entity (PDE) 127 and a mobile positioning center (MPC) 129, both of which have links to one or more STPs 123, to facilitate communications via the SS7 network 121. In assisted GPS (global positioning system) type deployments, for example, the PDE 127 provides data to the mobile stations 15 to expedite satellite acquisition; and it may determine the actual latitude and longitude (final fix) of a mobile station based on GPS measurements taken by the mobile station 15 at the PDE's request.

The process of locating a mobile station using Assisted GPS (AGPS) involves several elements. In practice, an MSC requests an instruction for routing to the closest PSAP; and in response the MPC 129 or other similar element requests location information for a particular mobile telephone station from the PDE 127. The MSC 117 or 119 serving the mobile station delivers messages to/from the mobile station, including those exchanged with the PDE 127, which provides the final fix to the MPC 129 for further processing, e.g. to determine the closest PSAP 27 and for delivery of the mobile station location to the PSAP 27.

Wireless carriers often take advantage of the flexibility offered by intelligent network triggers (e.g., WIN triggers or CAMEL triggers) to build subscriber services using service logic housed in SCPs external to the carrier's MSCs. The example of FIG. 3 assumes use of WIN triggers, for discussion purposes. Some of these services based on intelligent network type call processing and control place limits on the subscriber's ability to send or receive voice calls. Such services include prepaid service, but they also include services that allow a parent to place limits on a child's ability to make or receive calls. Other services may restrict incoming calls based on time of day, e.g. to block incoming calls during some period; whereas others may restrict who can or can not make incoming calls to the subscriber mobile station, e.g. based on the source (caller ID or the like) of the incoming call.

Such services are possible because, when these triggers are armed for a subscriber's mobile station, the signaling messages sent when these triggers are encountered can give an SCP 125:

1) Visibility of key call related information such as:
   a) The start of a call
   b) The number dialed by the subscriber (for outgoing calls placed by the subscriber)
   c) The caller's number (for calls placed to the subscriber)
   d) The end of the call
   e) The start and end of a calls
2) Control over the call including the ability to block or disconnect the call using service specific criteria such as:
   a) Whether money remains in a prepaid account, b) Whether the called or calling party is on a White List for the subscriber
c) Whether the called or calling party is on a Black List,
d) Whether the call is initiated during a Blackout period for the subscriber.

For example, on a call from mobile station $15_1$ to mobile station $15_2$, (incoming or in-bound to the mobile station $15_2$), the MSC 119 of mobile station $15_2$ will detect a trigger event in response to the incoming call to that destination station. The MSC 119 will launch a query through an STP 123 to the SCP 125, for example, identifying the destination mobile station and the type of trigger event. In response to the query, the SCP 125 accesses the call processing record associated with the destination mobile station $15_2$. Assume now that the call processing record indicates that there is an applicable restriction, e.g. to block calls unless from known sources (and station $15_1$ is not one of the known acceptable sources). The SCP 125 formulates and sends back an appropriate response, instructing the MSC 119 as to how to further process the call, in this case, instructing the MSC 119 to block the call. In a similar fashion, if a call came from the PSAP 27 to a mobile station $15_2$, having an applicable call restriction on incoming calls, the restriction would block the call from the PSAP. Hence, in the example of FIG. 3, the SCP 125 implements the function of disabling the restriction on incoming calls for some time period, responsive to a 911 call from the mobile station, to allow an opportunity for a callback from the PSAP 27.

Because of the critical nature of 911 calls, WIN services that otherwise limit a subscriber's ability to make and receive calls must not interfere with a subscriber's ability to place a 911 call. To insure this, MSC WIN trigger software has been designed to bypass or "escape" WIN triggers for 911 calls. This means that when a subscriber to a WIN service dials 911, the WIN SCP 125 does not receive the signaling messages that it would normally receive for a non-911 call.

However, not only is it necessary to support 911 calls for subscribers to services that place restrictions on a subscriber's ability to place or receive calls, it is also important to support 911 callback calls for such subscribers. The mechanism used to insure that WIN-based services do not interfere with a subscriber's ability to place 911 calls has the unfortunate side effect of hiding all knowledge of such 911 calls from a WIN SCP 125. Because MSCs escape WIN origination triggers for 911 calls, when a subscriber places a 911 call, the MSC does not notify the WIN SCP 125 at all of that call, not at the start of the 911 call, not at any point during the 911 call, and not when the 911 call ends.

Hence, to enable the call processing logic in the SCP 125 to trigger a temporary modification or suspension of a subscriber's incoming service restrictions when the subscriber places a 911 call, in the exemplary network of FIG. 3, another technique is needed to provide notification of the 911 call to the SCP. Two different examples of specific call processing in such a network, which provide the notification to the SCP, are discussed below with regard to the signal flow diagrams of FIGS. 4 and 5. For ease of illustration and discussion, these figures depict cases in which the mobile station is not roaming, and the HLR function for the mobile station may be internal to the Home MSC of the mobile station that makes the 911 call and receives the 911 callback from the PSAP. Similar processing would apply to calls for roaming mobile stations but with additional signaling with a home HLR and/or a home SCP.

Figure 4:
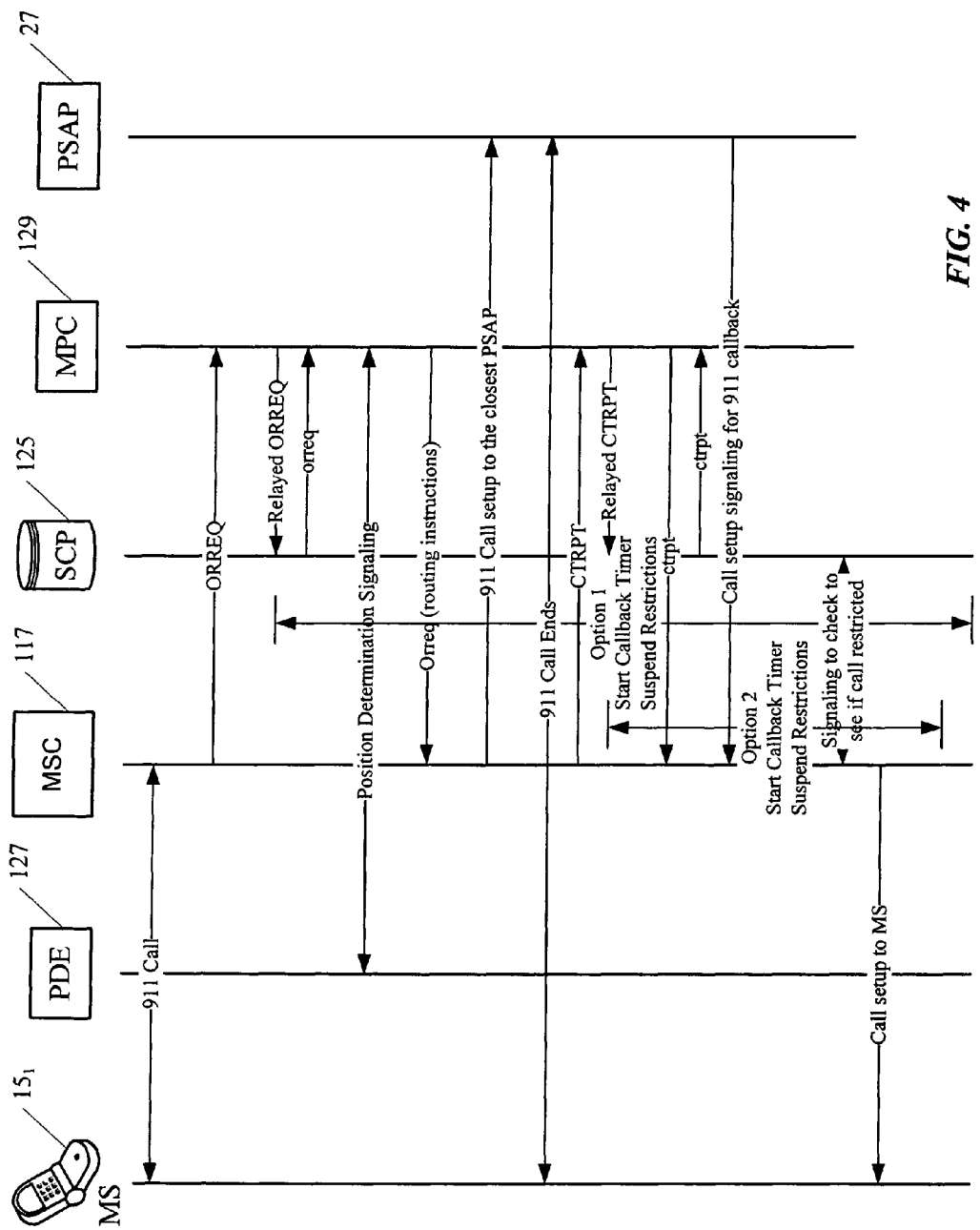
FIG. 4 is a simplified signal flow diagram useful in explaining a 911 call and associated callback, with a first exemplary implementation of a timed override of call restrictions in the network of FIG. 3.

The approach depicted in FIG. 4 relies on the MPC 129 to notify the SCP 125. The WIN MSCs operate in the normal manner, e.g. with the "escape" from WIN trigger processing for 911 emergency calls. For convenience, the solution is described in terms of the ANSI-41 signaling messages used by some CDMA wireless carriers to support Enhanced 911 (E911) services. However, the solution is not dependent on the use of those specific mechanisms; it could be easily adapted for any wireless carrier that takes advantage of the architecture described in the joint TIA/ANSI standard J-STD-036 to implement E911 service.

In the example of FIG. 4, assume a user of a mobile station $15_1$ places a 911 call. Following the procedures of J-STD-036, the Serving MSC 117 (or Anchor MSC when the subscriber is already on a call and has been handed off) sends an OriginationRequest message (ORREQ) to the MPC 129, to initiate the process of obtaining the geographic position of the subscriber and identifying the PSAP 27 to which the call should be routed, e.g. the closest available PSAP.

The MPC 129 effectively detects the user's attempt to make a 911 call from the mobile station $15_1$ based on its receipt of the OriginationRequest message (ORREQ). When the 911 call is placed by a subscriber that has subscribed to an incoming call restrictive service, in addition to the functions that the MPC currently carries out in support of Enhanced 911, when it receives this OriginationRequest message, the MPC 129 should additionally send a message to the WIN SCP 125 that:

Identifies the subscriber, and
Identifies the call as a 911 call.

This message will provide the WIN SCP 125 the notification that it needs to temporarily modify or suspend any WIN service restrictions that may apply to the subscriber's ability to receive incoming calls, thereby opening a time window during which 911 callback calls can reach the user of the mobile station $15_1$.

While, in principle, any message meeting the above listed criteria could be used, and the present teachings encompass the use of all such messages, there are advantages to simply using the OriginationRequest message just received by the MPC from the MSC as the message to be sent to the WIN SCP:

The OriginationRequest message is already understood by both MPCs and by WIN SCPs. No special development would be needed to add support for an additional protocol to either the MPCs or the WIN SCPs,
The OriginationRequest message is normally transmitted using SS7. Since MPCs and WIN SCPs are already connected to the SS7 network, SS7 connectivity between the MPCs and the WIN SCPs can be easily established,
The OriginationRequest message would identify the subscriber, and,
The OriginationRequest message would identify the call as a 911 call.

Hence, in the example of FIG. 4, when the MPC 129 receives the OriginationRequest message (ORREQ), it sends a corresponding relay message to the SCP 25, which the SCP may acknowledge (orreq). Since the sole purpose of the message sent to the SCP is to provide notification of the 911 call to the WIN SCP 125, the sending of this message should not be allowed to unnecessarily interfere in the normal 911 call processing that is carried out by the MPC 129. In particular, the MPC should not start a timer when it sends this message and await a response from the WIN SCP. Moreover, if the MPC 129 does receive a response from the WIN SCP, it should ignore that response.

Accordingly, the MPC 129 conducts normal signaling with the PDE 127 to determine the position of the mobile station $15_1$ making the 911 call. Based on that position, the MPC 129 determines the closest PSAP 27 and formulates and sends a routing instruction (Orreq) to the MSC 117 handling the 911 call. In response, the MSC 117 routes the 911 call to the appropriate PSAP 27. At this point, the initial 911 call from the mobile station $15_1$ to the MSC 117 is connected to the call to the PSAP 27, to complete the call to the PSAP in the normal manner. However, at some later time, the 911 call between the mobile station $15_1$ and the PSAP 27 ends.

Since the SCP 125 received notice of the 911 call from the mobile station $15_1$ from the MPC, the SCP can suspend or modify any applicable call restrictions for some period of time related to the 911 call. There are a number of ways to implement the timing. As in the flow chart of FIG. 2, two options are shown again in FIG. 4. Option 1 is to start a callback timer and suspend incoming call restrictions from the receipt of the notification of the 911 call, in this case, in response to the receipt of the relayed OriginationRequest message from the MPC 129. The period of this timer would be arbitrary, although it may be relatively long to insure that suspension of the call restrictions generally will extend for some time after the end of the 911 call.

The other option is to start the timer after the end of the call. Hence, in FIG. 4, the MSC 117 sends a signaling message such as a CTRPT (CallTerminationRePort) to the MPC 129, which relays that message to the SCP 125. The message identifies the mobile station 15, and the termination of the current call, in this case the 911 call. In response to the CTRPT, the SCP 125 starts the timer with respect to the mobile station $15_1$. The SCP 125 may modify or suspend the incoming call restrictions when it starts the timer in response to the CTRPT message; or the SCP may have suspended or modified the restrictions at some earlier point in the processing, e.g. in response to the initial notification by the related ORREQ message. In either case, the restrictions remain disabled until the timer expires, after which the SCP re-enables the applicable restrictions.

With both options, there is some time period after the end of the 911 call during which the call processing logic implemented by the WIN SCP 125 keeps the incoming call restrictions from blocking inbound calls to the mobile station $15_1$. Assume now that the PSAP 27 initiates callback during that period (as represented by the call setup signaling for 911 callback in FIG. 4). When the call signaling reaches the MSC 117, it hits the applicable WIN trigger with respect to the mobile station $15_1$, in the normal manner for calls to that station. Hence, the MSC 117 will launch a query to the SCP 125 and receive responsive routing instructions (represented as two-way signaling to check call restrictions in FIG. 4). In this case, since the restrictions are suspended or modified to disable any possible blocking of inbound calls, the instruction from the SCP 125 will enable the MSC to complete the call to the mobile station $15_1$. In this way, the network successfully completes the callback from the PSAP 27 to the mobile station $15_1$ that made the initial 911 call.

The above discussion of the example of FIG. 4 relied on the MPC to relay the OriginationRequest message that it receives from the MSC to the WIN SCP controlling the subscriber's WIN services. However, those skilled in the art will recognize that the approach is applicable to other implementations, independent of whether those implementations use:
  A different message to notify the WIN SCP of the 911 call,
  A network other than the SS7 network to carry the message from MPC to SCP, or
  Both a different message and a network other than the SS7 network.

A number of variations are possible in the way in which this OriginationRequest message relay function may be implemented, and the technique discussed herein should be regarded as applicable to all such implementations, including, but not limited to the cases in which the carrier provides the MPCs with:
  The identity of each WIN subscriber along with the network address of the WIN SCP providing service to that subscriber. In this case the MPCs need only to relay the OriginationRequest message for the 911 calls originated by a WIN subscriber that has subscribed to incoming call restrictive service.
  Routing information that allows the MPC to relay all OriginationRequest messages to its WIN SCPs, whether or not the 911 callers are WIN subscribers that has subscribed to incoming call restrictive service. In this case, it becomes the WIN SCPs responsibility to take action only for those relayed messages that identify a WIN subscriber and to discard the rest of the relayed messages.

Also, this technique should be regarded as covering implementation variations such as those in which:
  The MPC relays the OriginationRequest message to the WIN SCP immediately after the OriginationRequest message is received from the MSC, or
  The MPC delays the relay of the OriginationRequest message to the WIN SCP until after the MPC has responded to the OriginationRequest received from the MSC,
  The MPC does not relay the OriginationRequest message in those exceptional cases in which the OriginationRequest message does not reliably identify the subscriber. (Such exceptional cases may occur, e.g., if a 911 call is placed from a phone lacking a valid service subscription or if network problems have prevented the MSC from registering a subscriber's phone to the HLR).

It should be noted that the E911 architecture specified in J-STD-036 for GSM carriers is different than the architecture specified in J-STD-036 for CDMA carriers. At a high level, in a GSM network the functions provided in the ANSI-41 network by the MPC are instead split between two different network elements:
  The Serving Mobile Location Center (SMLC), which is sent a message by the MSC at the start of a 911 call (just as the MPC is sent an OriginationRequest message at the start of a 911 call in ANSI-41 networks).
  The Gateway Mobile Location Center (GMLC), which provides the 911 caller's geographic position received to an Emergency Service Message Entity (just as the MPC does in an ANSI-41 network).

The call processing technique of FIG. 4 may be implemented in GSM networks in which either the SMLC or the GMLC sends a message to a SCP when a GSM subscriber to WIN services places a 911 call. Of course, a different message used in a GSM implementation, as the OriginationRequest message is not a GSM MAP message; however, one of skill in the art familiar with GSM signaling should be readily able to select an appropriate signaling message.

Figure 5:
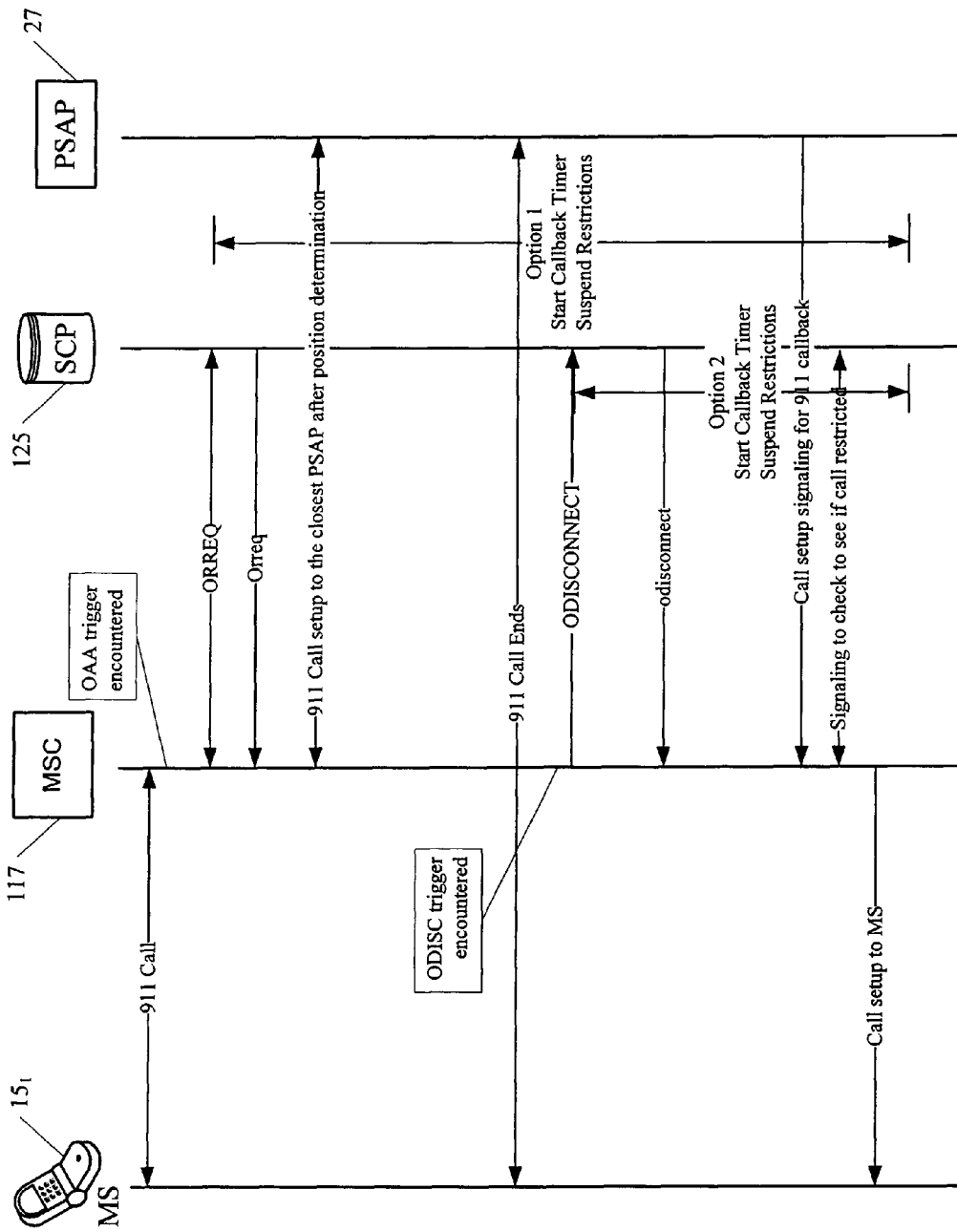
FIG. 5 is a simplified signal flow diagram useful in explaining a 911 call and associated callback, with a second exemplary implementation of a timed override of call restrictions in the network of FIG. 3.

FIG. 5 depicts another approach to providing the notification to the SCP, in a WIN type implementation of a mobile communications network like that of FIG. 3, to support starting the period of suspension or modification for incoming call service restrictions at any time between the beginning and the end of the 911 call. This alternate approach involves a modification of the MSC's WIN trigger processing for 911 calls in such a way that the MSC does not bypass or escape the trigger on the 911 calls.

The solution will be described in terms of the WIN triggers used to build WIN services supporting restrictions on a subscriber's ability to place and receive calls. These triggers are the triggers defined in TIA standard TIA IS-826. However, the solution is transferable to systems that use other WIN standards (e.g., GSM CAMEL) to build such services. TIA IS-826 defines two different sets of triggers that would be used to build WIN services that control a subscriber's calls. One set of triggers is used to build services that control a subscriber's ability to place calls; and a second set of triggers is used to build services that control a subscriber's ability to receive calls.

There are four triggers in the set of triggers that are used to build services that controls a subscriber's ability to place calls, the Originating_Attempt_Authorized (OAA) trigger, the Calling_Routing_Address_Available (CgRAA) trigger, the O_Answer (OANS) trigger, and the O_Disconnect (ODISC) trigger. When these IS-826 origination triggers are armed for a subscriber, these triggers are normally encountered at the following points in call processing:

OAA—The MSC has received and authorized a call attempt from the subscriber's handset.
  Note: The WIN message (the OriginationRequest message) sent by the MSC to the WIN SCP at this trigger detection point is the only WIN message used for IS-826 triggers that is guaranteed to carry both information identifying the subscriber to the WIN SCP and the number actually dialed by the subscriber.
  Note: MSC authorization is based on general calling permissions received from the subscriber's HLR. The WIN SCP may block the call anyway.
CgRAA—The MSC has determined the routing address for the call.
  Note: The WIN message (the AnalyzedInformation message) sent by the MSC to the WIN SCP at this trigger detection point, would, for ordinary, non-911 calls often carry the number actually dialed by the subscriber. (It does carry information that identifies the subscriber to the WIN SCP.)
  But, in contrast, this AnalyzedInformation message will, for 911 calls, often not carry the digits 911 actually dialed by the subscriber.
OANS—The MSC detects that the call has been answered.
  Note: The WIN message (the OAnswer message) sent by the MSC to the WIN SCP at this trigger detection point never carries the number dialed by the subscriber. (It does carry information that identifies the subscriber to the WIN SCP.)
ODISC—The MSC detects that the call has ended. (This only applies if the call was previously answered.)
  Note: The WIN message (the ODisconnect message) sent by the MSC to the WIN SCP at this trigger detection point never carries the number dialed by the subscriber. (It does carry information that identifies the subscriber to the WIN SCP.)

Hence, in this example, the MSC's WIN trigger processing for 911 calls is modified in such a way that the MSC not escape the OAA trigger. There are a number of possible variants of WIN trigger processing modification for 911 calls, including:

The MSC's WIN trigger processing is modified to not escape the OAA trigger for 911 calls; MSC processing of the CgRAA, OANS, and ODISC triggers for 911 calls is not modified.

The MSC's WIN trigger processing is modified to not escape the OAA and CgRAA triggers for 911 calls; MSC processing of the OANS and ODISC triggers is not modified.

The MSC's WIN trigger processing is modified to not escape the OAA and OANS triggers for 911 calls; MSC processing of the CgRAA, and ODISC triggers is not modified.

The MSC's WIN trigger processing is modified to not escape the OAA and ODISC triggers for 911 calls; MSC processing of the CgRAA, and OANS triggers is not modified.

The MSC's WIN trigger processing is modified to not escape the OAA, OANS, and ODISC triggers for 911 calls; MSC processing of the CgRAA trigger is not modified.

The MSC's WIN trigger processing is modified to not escape the OAA, CgRAA, and ODISC triggers for 911 calls; MSC processing of the OANS trigger is not modified.

The MSC's WIN trigger processing is modified to not escape the OAA, CgRAA, and OANS triggers for 911 calls; MSC processing of the ODISC trigger is not modified.

The MSC's WIN trigger processing is modified to not escape the OAA, CgRAA, OANS, and ODISC triggers for 911 calls.

Any of these variants provide the WIN SCP with notification when the subscriber places a 911 call, allowing the WIN SCP to temporarily suspend or modify WIN service related restrictions on the subscriber's ability to receive incoming calls that might otherwise prevent PSAP originated 911-callback calls from reaching the subscriber.

For purposes of the discussion of the specific example of FIG. 5, we will assume the variant that modifies the MSC processing of both the OAA trigger and the ODISC trigger, since these variants allow the WIN SCP to begin the temporary suspension or modification of any WIN service restrictions on the subscriber's ability to receive a call to closely coincide with the time when the 911 call ends, rather than when the 911 call begins. As noted above, this insures that the PSAP can take advantage of the full duration of any temporary suspension or modification of WIN service restrictions on the subscriber's ability to receive 911-callback calls.

With specific reference to the call flow illustrated in FIG. 5, assume again that a user of a mobile station 15$_1$ places a 911 call. The MSC 117 processing that call will encounter the OAA trigger. In response to the OAA trigger, the Serving MSC 117 (or Anchor MSC when the subscriber is already on a call and has been handed off) sends an OriginationRequest message (ORREQ) to the SCP 125. If the SCP implements option 1, it would suspend or modify any applicable restrictions for some period of time to permit callback. The SCP 125 will respond to the MSC 117 with a message Orreq instructing the MSC 117 to complete the call. Alternatively, since the sole purpose of the message sent to the SCP is to provide notification of the 911 call to the WIN SCP 125, the MSC could proceed with call completion without waiting for the response and/or ignore the response if received. Signaling to the MPC to determine the closest PSAP is omitted from the illustration of the example, as in this case it does not impact the timed suspension or modification of incoming call restrictions. Hence, the MSC will complete the call to the closest PSAP 27. At this point, the initial 911 call from the mobile station 15$_1$ to the MSC 117 is connected to the call to the PSAP 27, to complete the call to the PSAP in the normal manner. However, at some later time, the 911 call between the mobile station 15$_1$ and the PSAP 27 ends.

In the example of FIG. 5, the processing of the end of the 911 call by the MSC 117 encounters the ODISC trigger. Upon hitting that trigger event, the MSC 117 sends a signaling message (ODISCONNECT) informing the SCP 125 of the end of the 911 call, and the SCP 125 may send back a reply message (odisconnect). Of note for purposes of this discussion, the ODISCONNECT message from the MSC 117 enables the SCP 125 to implement the second option for suspending or modifying incoming call restrictions.

In response to the ODISCONNECT message, the SCP 125 starts the timer with respect to the mobile station $15_1$. The SCP 125 may suspend or modify the incoming call restrictions when it starts the timer in response to the ODISCONNECT message; or the SCP may have disabled the restrictions at some earlier point in the processing, e.g. in response to the initial notification by the related ORREQ message. In either case, the restrictions remain disabled until the timer expires, after which the SCP re-enables the applicable restrictions.

With both options, there is some time period after the end of the 911 call during which the call processing logic implemented by the WIN SCP 125 keeps the incoming call restrictions from blocking incoming calls to the mobile station $15_1$. Assume now that the PSAP initiates callback during that period (as represented by the call setup signaling for 911 callback in FIG. 5). When the call signaling reaches the MSC 117, it hits the applicable WIN trigger with respect to the mobile station $15_1$. Hence, the MSC 117 will launch a query to the SCP 125 and receive responsive routing instructions (represented as two-way signaling to check call restrictions in FIG. 5). In this case, since the restrictions are suspended or modified to not block incoming calls, the instruction from the SCP 125 will enable the MSC to complete the call to the mobile station $15_1$. In this way, the network successfully completes the callback from the PSAP 27 to the mobile station $15_1$ that made the initial 911 call.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of call processing in a communication network, comprising steps of:
   detecting an outgoing emergency call from a subscriber station configured for communication via the network at an element in the network, wherein call processing logic in the network uses a record specifically associated with the subscriber station for applying a station-specific restriction on incoming calls for the subscriber station;
   completing the emergency call from the subscriber station through the network to an answering point;
   detecting an end of the completed emergency call from the subscriber station to the answering point; and
   responsive to the detected end of the completed emergency call, automatically causing the call processing logic in the network to suspend or modify the station-specific restriction on incoming calls for a time period, so as to disable the restriction and enable completion of any incoming call to the subscriber station following the emergency call,
   wherein the time period begins from the time of the detecting of the end of the completed emergency call, and
   wherein the detecting the end of the completed emergency call comprises receiving a message, from a switch of the communication network, indicative of the end of the emergency call detected by the switch.

2. The method of claim 1, further comprising re-enabling the restriction on incoming calls after expiration of the time period.

3. The method of claim 1, further comprising:
   after an end of the completed emergency call between the subscriber station and the answering point, detecting an incoming call during the time period when the restriction is suspended or modified; and
   completing the detected incoming call to the subscriber station, without application of the restriction.

4. The method of claim 1, wherein:
   the restriction on incoming calls relates to a balance on a prepaid account associated with calls for the subscriber or the subscriber station; and
   the step of suspending or modifying the restriction on incoming calls comprises adding a free credit to the balance on the prepaid account.

5. The method of claim 1, wherein the station-specific restriction on incoming calls is a restriction selected from the group of services consisting of: a call blocking service, a parental control service, a call forwarding, service, a multiple call alerting service, a Selective Call Acceptance service, and a "Do Not Disturb" call intercept service.

6. The method of claim 1, further comprising a step of:
   upon detecting the outgoing emergency call, routing to an application server a session initiation protocol (SIP) signaling message for the set-up of the call,
   wherein the application server is configured to perform the step of automatically causing the call processing logic to suspend or modify the station-specific restriction.

7. The method of claim 1, wherein the detecting the end of the emergency call comprises receiving a notification, from a call server control function (CSCF) server that handles emergency calls, upon completion of the emergency call.

8. The method of claim 7, wherein the notification received from the CSCF is received in a home subscriber server (HSS), the method further comprising, upon suspending or modifying the station-specific restriction, sending a notification from the HSS to at least one application server indicative of the suspension or modification of the station-specific restriction.

9. The method of claim 1, wherein the detecting the end of the completed emergency call comprises at a service control point receiving a call termination report identifying the subscriber station and the termination of the emergency call.

10. A method of call processing in a wireless mobile communication network, comprising steps of:
    detecting an attempt to make an outgoing emergency call from a mobile station configured for communication via the wireless mobile communication network, at a mobile positioning center;
    completing the emergency call from the mobile station through the wireless mobile communication network to an answering point;
    detecting an end of the completed emergency call from the mobile station to the answering point, at the mobile positioning center; and
    in response to the detected end of the completed emergency call, notifying a service control point from the mobile positioning center of the end of the completed emergency call, the service control point having access to a call processing record specifically for the mobile station for causing the network to apply a station-specific restriction on incoming calls for the mobile station; and
    at the service control point, automatically suspending or modifying the station-specific restriction on incoming calls through the wireless mobile communication network to the mobile station for a time period, so as to disable the restriction and enable completion of any incoming call to the mobile station following the emergency call, wherein the step of automatically suspending or modifying the restriction comprises starting the time period from the detected time of the end of the completed emergency call in response to the message notifying the service control point of the end of the completed emergency call, and wherein the detecting the end of the completed emergency call comprises receiving a message, from a switch of the communication network, indicative of the end of the emergency call detected by the switch.

11. The method of claim 10, wherein the step of detecting the attempt to make the outgoing emergency call from the mobile station comprises receiving a signaling message from a mobile switching center of the wireless mobile communication network, at the mobile positioning center.

12. The method of claim 10, further comprising the step of: notifying the service control point, from the mobile positioning center, of the attempt to make the outgoing emergency call from the mobile station.

13. The method of claim 10, wherein the detecting of the end of the completed emergency call comprises receiving a "call termination report" message from a mobile switching center of the wireless mobile communication network, at the mobile positioning center.

14. The method of claim 10, wherein the station-specific restriction on incoming calls is a restriction selected from the group of services consisting of: a call blocking service, a parental control service, a call forwarding, service, a multiple call alerting service, a Selective Call Acceptance service, and a "Do Not Disturb" call intercept service.

15. A method of call processing in a wireless mobile communication network, comprising steps of:

detecting an attempt to make an outgoing emergency call from a mobile station configured for communication via the wireless mobile communication network, at a mobile switching center of the network;

completing the emergency call from the mobile station through the wireless mobile communication network to an answering point;

detecting an end of the completed emergency call from the mobile station to the answering point at the mobile switching center;

in response to detecting the end of the completed emergency call, triggering a message to a service control point from the mobile switching center notifying the service control point of the end of the completed emergency call, the service control point having access to a call processing record specifically for the mobile station for causing the network to apply a station-specific restriction on incoming calls for the mobile station; and at the service control point, automatically suspending or modifying the station-specific restriction on incoming calls through the wireless mobile communication network to the mobile station for a time period, so as to disable the restriction and enable completion of any incoming call to the mobile station following the emergency call, wherein the step of automatically suspending or modifying the restriction comprises starting the time period from the time of the end of the completed emergency call in response to the message notifying the service control point of the end of the completed emergency call.

16. The method of claim 15, further comprising the step of: triggering a message from the mobile switching center to the service control point, notifying the service control point of the attempt to make the outgoing emergency call from the mobile station.

17. The method of claim 15, wherein the station-specific restriction on incoming calls is a restriction selected from the group of services consisting of: a call blocking service, a parental control service, a call forwarding, service, a multiple call alerting service, a Selective Call Acceptance service, and a "Do Not Disturb" call intercept service.

18. A method of call processing in a wireless mobile communication network, comprising steps of:

detecting an attempt to make an outgoing emergency call from a mobile station configured for communication via the wireless mobile communication network, at a mobile switching center of the network;

completing the emergency call from the mobile station through the wireless mobile communication network to an answering point;

detecting an end of the completed emergency call between the mobile station and the answering point at the mobile switching center;

in response to detecting the end of the completed emergency call, triggering a message to a service control point from the mobile switching center notifying the service control point of the end of the completed emergency call, the service control point having access to a call processing record specifically for the mobile station for causing the network to apply a station-specific restriction on incoming calls for the mobile station; and at the service control point, automatically suspending or modifying the station-specific restriction on incoming calls through the wireless mobile communication network to the mobile station for a time period, so as to disable the restriction and enable completion of any incoming call to the mobile station following the emergency call, wherein the step of automatically suspending or modifying the restriction comprises starting the time period from the time of the end of the completed emergency call in response to the message notifying the service control point of the end of the completed emergency call, and wherein the steps of detecting the end of the completed emergency call and triggering the message notifying the service control point of the end of the completed emergency call are implemented by an O_Disconnect (ODISC) trigger set, in the mobile switching center, with respect to emergency calls for the mobile station.

19. A communication network, comprising:

a switch fabric for establishing communications to and from stations configured for communication through the network;

processing logic in the communication network for controlling the switch fabric in response to attempts to establish communications for the stations, to implement communication services offered by an operator of the network to subscribers associated with the stations; and a record in the network, specifically associated with one of the stations, for use by the processing logic in controlling call processing for the one station through the switch fabric, wherein the processing logic is configured to:

(a) use the record specifically associated with the one station and control the switch fabric to implement a station-specific restriction on incoming calls to the one station, and (b) receive a message, from a switch of the switch fabric, indicative of the end of the emergency call detected by the switch, and (b) to (c) upon receiving the message indicative of the end of the emergency call, control the switch fabric to suspend or modify processing of incoming calls for the one station for a time period beginning from a time of the end of an emergency call from the one station to an answering point, in such a manner as to disable the restriction and enable completion of any incoming call to the one station, in response to the emergency call from the one station through the network to the answering point.

20. The communication network of claim 19, wherein:
the switch fabric comprises a plurality of switches configured as intelligent network service switching points;
the processing logic comprises a service control point in signaling communication with the service switching points; and
the record comprises a call processing record in a subscriber database of the service control point.

21. The communication network of claim 20, further comprising:
a mobile positioning center coupled to one or more of the switches for obtaining information regarding the position of the one station during processing of the emergency call,
wherein the mobile positioning center is configured to provide a notification regarding the emergency call, to the service control point.

22. The communication network of claim 20, wherein at least one of the service switching points is configured to trigger a notification to the service control point in response to the emergency call.

23. The communication network of claim 19, wherein the processing logic is further configured to re-enable the restriction on incoming calls after expiration of the time period.

24. The communication network of claim 19, wherein:
the switch fabric comprises a call server control function (CSCF) server for handling of emergency calls;
the processing logic comprises a home subscriber server (HSS);
the CSCF is configured to detect an end of the emergency call and send a notification to the HSS upon completion of the emergency call; and
the HSS is configured to, upon suspending or modifying processing of incoming calls for the one station, send a notification to at least one application server of the communication network indicative of the suspension or modification of the station-specific restriction.

25. The communication network of claim 19, wherein the processing logic is configured to suspend or modify processing of incoming calls upon receiving at least one of a call termination report (CTRPT) identifying the subscriber station and the termination of the emergency call, and an O_Disconnect (ODISC) trigger set.

* * * * *